United States Patent [19]
Focke et al.

[11] Patent Number: 5,341,912
[45] Date of Patent: Aug. 30, 1994

[54] APPARATUS FOR TURNING (CIGARETTE) PACKS

[75] Inventors: Heinz Focke, Verden; Hans-Jürgen Bretthauer, Bremen, both of Fed. Rep. of Germany

[73] Assignee: Focke & Co. (GmbH & Co.), Verden, Fed. Rep. of Germany

[21] Appl. No.: 50,777

[22] Filed: Apr. 22, 1993

[30] Foreign Application Priority Data

May 4, 1992 [DE] Fed. Rep. of Germany ....... 4214321

[51] Int. Cl.⁵ .............................................. B65G 47/24
[52] U.S. Cl. ..................................... 198/415; 271/185
[58] Field of Search ............ 198/415; 221/173; 271/185

[56] References Cited

U.S. PATENT DOCUMENTS

| | | | |
|---|---|---|---|
| 1,192,832 | 7/1916 | Sherman. | |
| 4,155,440 | 5/1979 | Bogdanski et al. | 198/415 X |
| 4,185,921 | 1/1980 | Godai et al. | 198/415 X |
| 4,901,842 | 2/1990 | Lemboke et al. | 198/415 |
| 5,074,400 | 12/1991 | Focke et al. | 198/415 |

FOREIGN PATENT DOCUMENTS

| | | |
|---|---|---|
| 0364376 | 7/1920 | Fed. Rep. of Germany. |
| 1060767 | 7/1959 | Fed. Rep. of Germany. |
| 1756233 | 4/1970 | Fed. Rep. of Germany. |
| 2510094 | 11/1975 | Fed. Rep. of Germany. |
| 3016940 | 11/1981 | Fed. Rep. of Germany ...... 198/415 |
| 3443071 | 6/1985 | Fed. Rep. of Germany. |
| 3917115 | 11/1990 | Fed. Rep. of Germany. |
| 4027433 | 3/1992 | Fed. Rep. of Germany. |
| 4041477 | 6/1992 | Fed. Rep. of Germany. |
| 0849586 | 11/1939 | France. |
| 0244847 | 10/1987 | Japan ................................. 271/185 |
| 0123739 | 5/1988 | Japan ................................. 271/185 |
| 2224986 | 5/1990 | United Kingdom. |

*Primary Examiner*—James R. Bidwell
*Attorney, Agent, or Firm*—Sughrue, Mion, Zinn, Macpeak & Seas

[57] ABSTRACT

Disclosed is an apparatus for turning (cigarette) packs. Laterally acting driven turning belts (21, 22, 23, 24) serve for turning (cigarette) packs (10) during transport of the packs along a pack track (18). Two pairs of turning belts (21, 22) and (23, 24) act upon lateral regions of the packs (10) which arrive in a position, in which their longitudinal dimension is directed transversely relative to the conveying direction. The turning belts (21, 22) of the one side are driven at a different speed compared to the turning belts (23, 24) of the other side, so that the packs (10) are oriented in an increasingly oblique manner during transport. After the packs (10) have assumed an extreme oblique position, the turning procedure is completed by stationary lateral guides (40, 41) which are disposed so as to converge in the conveying direction.

7 Claims, 3 Drawing Sheets

APPARATUS FOR TURNING (CIGARETTE) PACKS

BACKGROUND OF THE INVENTION

The invention relates to an apparatus for turning elongated, especially cuboid packs which are transported along a pack track in spaced relationship and with their longitudinal dimension directed transversely relative to the conveying direction, and which are rotated by conveyor belts which are driven at differing speeds and laterally engage the packs.

Such an apparatus is disclosed in DE-A-39 17 115. The cuboid cigarette packs are engaged at upright edges by lateral convey or belts during transport and are rotated as a result of the differing conveying speeds of the conveyor belts, such that, finally, the packs are directed in the conveying direction with their longitudinal dimension. The lateral convey or belts travel in upright planes, i.e. about upright deflecting rollers, and converge in the direction of transport.

SUMMARY OF THE INVENTION

On the basis of this prior art, it is the object of the invention to construct the apparatus for turning packs during transport in such a way that the turning procedure is conducted more securely and more reliably without any mechanical impairments of the packs, even at high transport speeds.

To attain this object, the apparatus according to the invention is characterized in that each pack is engageable, at two opposite side regions of pack faces directed upwards and downwards, respectively, by upper and lower conveyor belts traveling in the conveying direction, and in that the conveyor belts are driven at differing speeds.

Cuboid cigarette packs are transported such that their elongated side faces are directed upwards and downwards, respectively, and their longitudinal dimension is directed transversely relative to the conveying direction. The conveyor belts, in particular turning belts, engage the side faces of the packs, adjacent to laterally directed end faces and bottom faces. As a result of the differing conveying speeds of these turning belts, the packs are rotated during transport, so that they are finally directed with their longitudinal dimension in the conveying direction.

Two turning belts are disposed on each side of the pack track, in particular an upper and a lower turning belt on each side. Accordingly, each pack is engaged at an underside and top side during the turning procedure. The two turning belts which are disposed on the same side of the pack track are driven at the same speed.

According to the invention, the turning belts effect only a partial rotation of the packs. Lateral stationary guides adjoin the turning belts and converge in the conveying direction. These guides are designed such that the rotation of the packs is completed as a result of the packs contacting the guides.

Further details of the invention are described hereinafter with reference to an exemplary embodiment and the accompanying drawings, in which:

DESCRIPTION OF A PREFERRED EMBODIMENT

Figure 1:
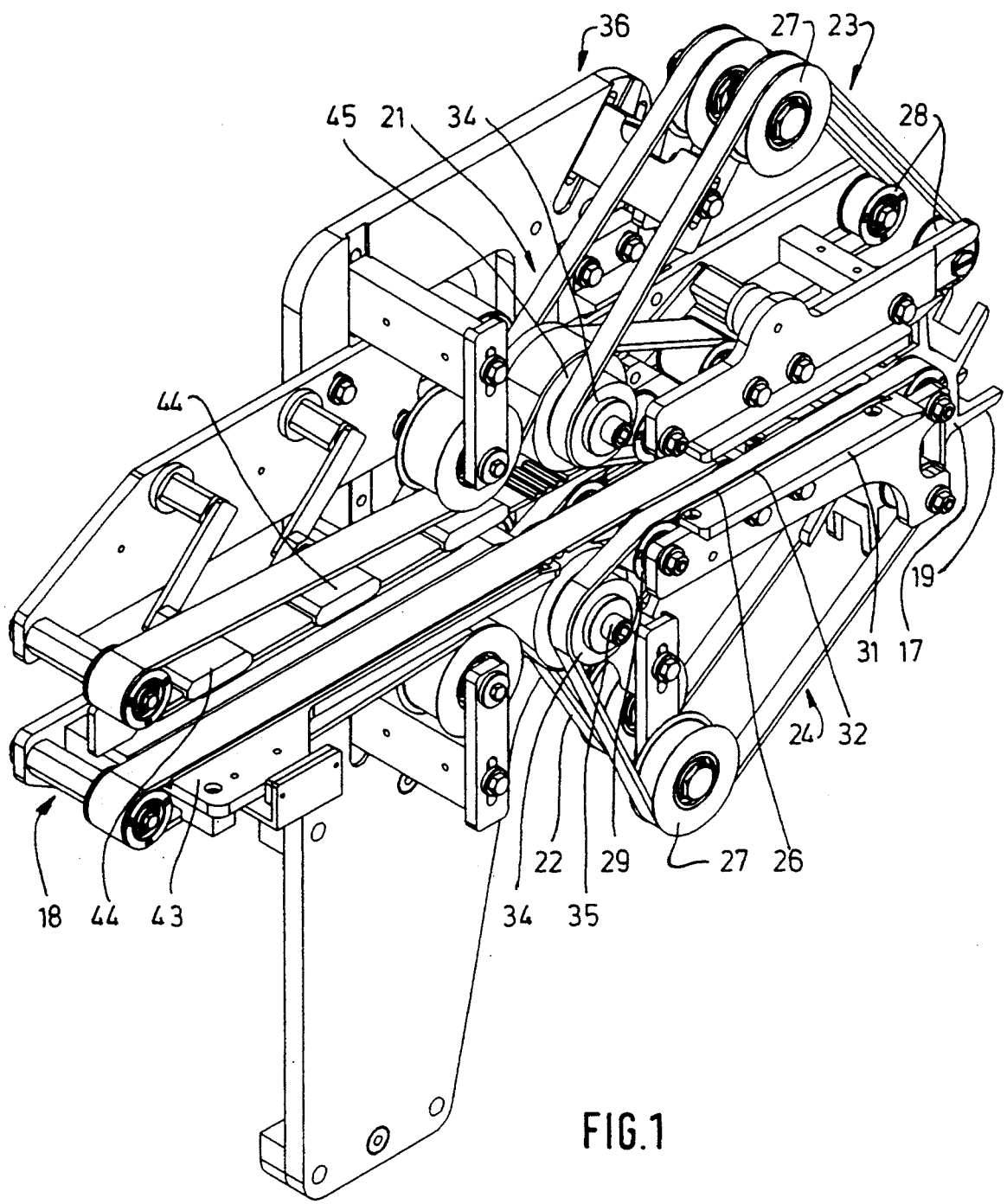
FIG. 1 shows a perspective view of a turning apparatus for cuboid packs.
Figure 2:
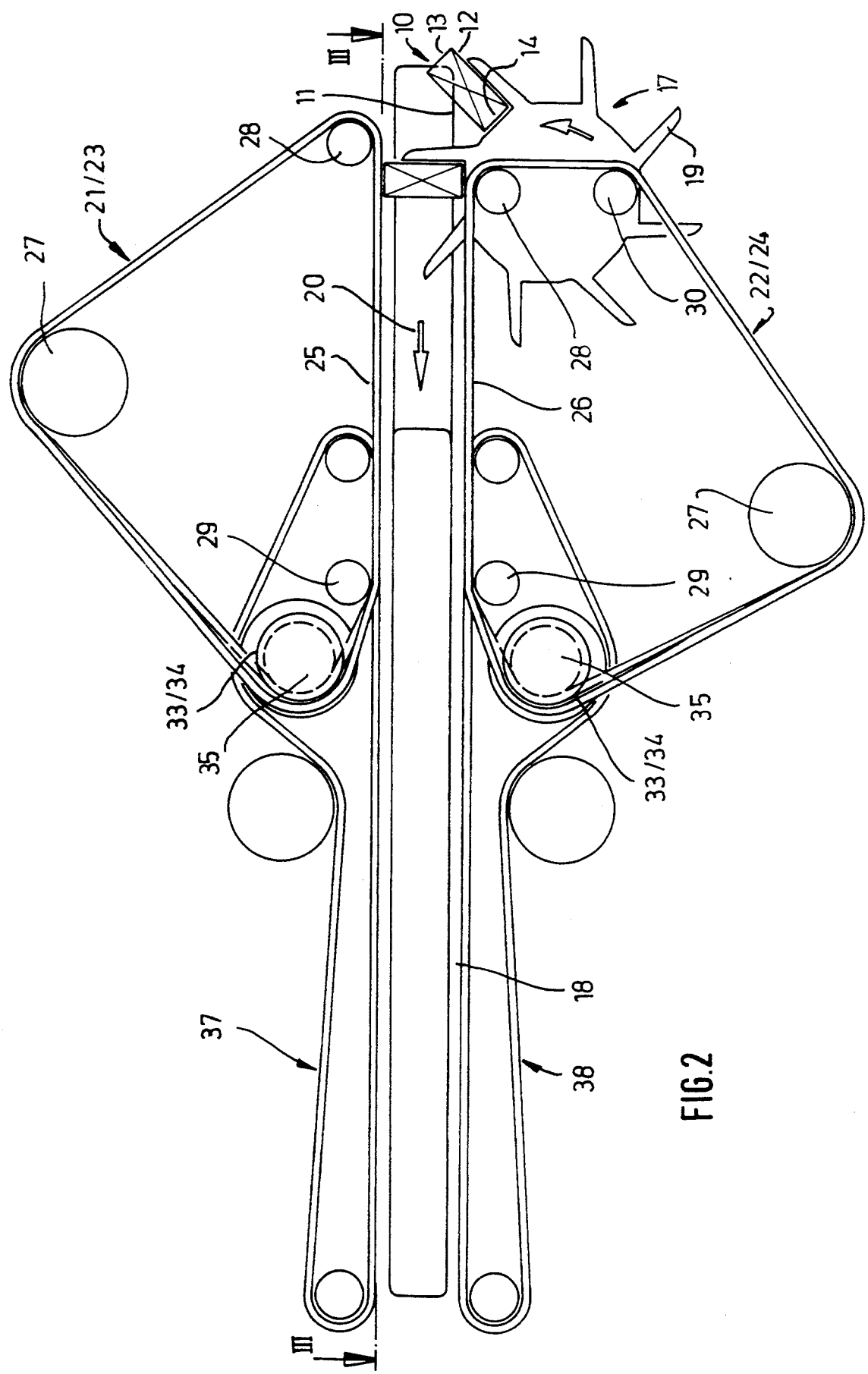
FIG. 2 is a schematic side view showing details of the apparatus of FIG. 1.

The illustrated exemplary embodiment is directed to the transport and the handling of cuboid packs 10, in particular cigarette packs. These packs come from a packaging machine, that is to say a drying turret of the packaging machine. The packs 10 are fed to another packaging machine in which they receive an outer wrapping made of cellophane or plastic film.

The packs 10 arrive in a specific relative position, in particular with their longitudinal dimension directed transversely relative to the conveying direction. Large pack faces, namely front side 11 and rear side 12 point forward and rearward in the transport direction, respectively. Elongated longitudinal sides 13 and 14 point upwards and downwards and are directed transversely relative to the conveying direction with their longitudinal dimension. The end side 15 and bottom side 16 of the pack 10 extend in the conveying direction, but are directed laterally.

The packs 10 are introduced into a horizontally extending pack track 18 by a feed conveyor which takes the form of a star wheel 17. The star wheel 17 has driving members 19 which are disposed at an angle relative to the radial direction. Each driving member 19 engages a pack 10 at the large-surfaced rear side 12 and transports it into the pack track 18.

In the region of the pack track 18, each pack 10 is engaged at the top side and underside and is transported in the direction indicated by the arrow 20. The packs 10, which are transported in spaced relationship, are engaged immediately in the region of the star wheel 17 by upper and lower turning means, in particular by turning belts 21, 22 and 23, 24. These turning belts engage each pack 10 with an upper and lower conveying strand 25 and 26 in the region of the longitudinal sides 13 and 14, adjacent to the end side 15 and bottom side 16.

The turning belts 21..24 are guided over several deflecting rollers 27, 28, 29 and 30. Each horizontal conveying strand 25, 26 is formed between the deflecting rollers 28 and 29. This conveying strand 25, 26 is supported by an underguideway 31 which takes the form of a stationary plate having a groove 32 in which the conveying strand 25, 26 travels.

Figure 3:
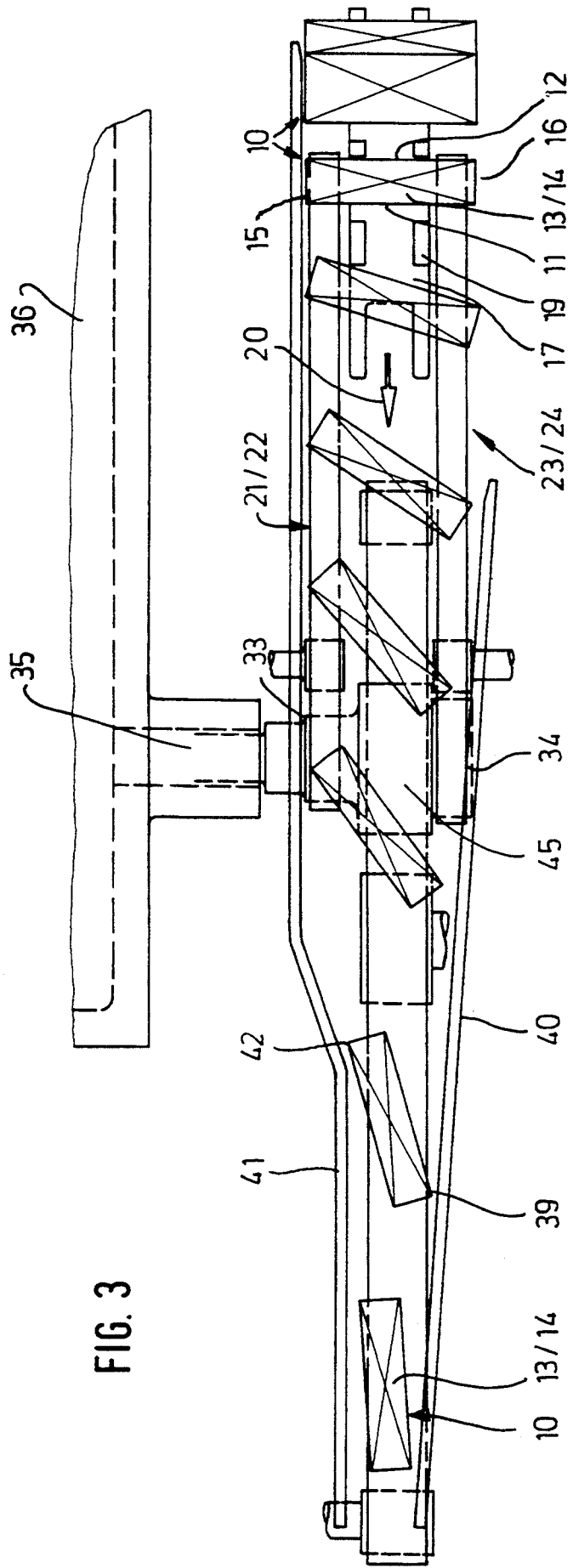
FIG. 3 shows a horizontal section of the apparatus taken on line III—III of FIG. 2.

Each turning belt 21..24 is associated with a drive roller 33, 34 which is disposed offset relative to the conveying strand 25, 26. The upper and lower turning belts 21..24 are associated with separate drive rollers 33, 34 which are, at the top and bottom, arranged on a common drive shaft 35, respectively. The drive rollers 33 and 34 have different diameters, so that, in the present exemplary embodiment (FIG. 3), the turning belts 23 and 24 are driven at a higher conveying speed because of the greater diameter of the associated drive roller 34. The drive shafts 35 are mounted in a portion of the machine frame 36.

After entering the pack track 18, the packs 10 are, first of all, transported only by the turning belts 21..24. In this process, the side of the packs 10 which is directed toward the turning belts 23, 24 is conveyed faster, so that the packs 10 are oriented in an increasingly oblique position. In the further course of the transport, the packs 10, which a re already in an oblique position, reach the vicinity of upper and lower conveyor belts 37, 38. These conveyor belts 37, 38 engage the packs 10 at the top and bottom—in the region of the longitudinal sides 13 and 14—slightly outside their central region. The conveyor belts 37, 38 are disposed slightly off-center between, on the one hand, the turning belts 21, 22 and, on the other hand, the turning belts 23, 24. As a result, the packs 10 project from the region of the conveyor belts 37, 38 with a relatively large portion which is directed to the rear.

While the packs 10 are transported only by the conveyor belts 37, 38, the procedure of turning the packs 10 is continued and (nearly) completed. For this purpose, lateral guiding means act on the obliquely oriented packs 10. An upright edge 39 which is in front with respect to the transport direction contacts a lateral guide 40 which extends in an inclined and converging manner relative to the conveyor belts 37, 38 in the conveying direction. The lateral guide 40 extends up into the region between the conveyor belts 37, 38.

On the opposite side, there is lateral guide 41 which has a different design and acts upon a rearward and laterally directed upright edge 42 of the pack 10. This lateral guide 41 is also formed and disposed such that the packs 10 finally assume, between the conveyor belts 37, 38, a position in which they are directed with their longitudinal dimension at least approximately in the conveying direction. The lateral guide 41 is provided with an end portion which extends parallel relative to the direction of movement of the packs 10. The conveyor belts 37, 38 are followed by further transporting means which extend the pack track 18 and which are associated with lateral guides in a conventional manner in order to accurately position the packs 10.

The lower conveyor belt 38, that is to say its (upper) conveying strand also travels in a supporting guide, in particular in a supporting plate 43 with a groove. The upper conveyor belt 37, that is to say its conveying strand which faces downwards is also associated with supporting bodies 44.

In the present case, the belts take the form of toothed belts. Accordingly, all deflecting rollers or wheels are provided with an appropriate toothed profile.

In the above described exemplary embodiment, the drive mechanism s simplified even further because a drive drum 45 for the upper and lower conveyor belts 37, 38 is disposed, respectively, on each common shaft 35. The drive drum 45 is located between the drive rollers 33 and 34 and has a diameter which corresponds to the driving speed of the conveyor belts 37, 38.

In this exemplary embodiment, the turning belts 21..24 take the form of smooth conveyor belts. If critical packs 10 are transported, it may be useful to dispose driving members on the side of the turning belts 21..24 which faces the packs 10. In this case, the driving members of the turning belts which are located on the one side of the pack track 18 are spaced out differently compared to the driving members of the turning belts 23, 24 on the other side, in accordance with the increasingly oblique position of the packs 10.

What is claimed is:

1. In an apparatus for turning elongated cuboid packs (10) which are transported in a conveying direction along a pack track (18) in spaced relationship and with their longitudinal dimension directed transversely relative to the conveying direction, and which are turned by conveyor belts which are driven at different speeds and laterally engage the packs, the improvement wherein:
   a) said apparatus comprising a plurality of upper and lower pack-conveying conveyor belts which engage each pack at pack faces thereof that are directed vertically upwardly and downwardly, respectively;
   b) said plurality of conveyor belts comprises two upper and two lower pack-conveying conveyor belts that also function as upper and lower pack-turning belts (21, 22, 23, 24), said pack-turning belts being disposed in such a manner that they engage the upwardly and downwardly directed pack faces at two respective opposite sides regions thereof;
   c) said upper and lower turning belts (21, 22, 23, 24) are oppositely located and convey the packs (10) by engaging opposite elongated longitudinal sides (13, 14) thereof that face upwardly and downwardly, each pack being turnable about a vertical axis thereof;
   d) said turning belts (21, 22, 23, 24) have conveying strands (25, 26) which engage the packs (10), said apparatus comprising means for moving said conveying strands at different speeds;
   e) said plurality of conveyor belts also comprises a pair of additional upper and lower conveyor belts (37, 38) which do not turn the packs and which exclusively convey the packs in the conveying direction at least in a region which adjoins said turning belts (21 . . . 24); and
   f) for completing the turning of the packs (10), said apparatus further comprises lateral guide means disposed in the region of said additional conveyor belts (37, 38).

2. The apparatus as claimed in claim 1, wherein the packs (10) are rotatable by the turning belts (21, 22, 23, 24) up to a position at an acute angle relative to said conveying direction, and wherein said lateral guide means comprises a pair of lateral guides (40, 41) which rotate the packs until they are aligned in the conveying direction, and which are disposed so as to converge in said conveying direction.

3. The apparatus as claimed in claim 1 or 2, wherein said additional conveyor belts (37, 38) have a width that is substantially less than the longitudinal dimension of the packs (10).

4. The apparatus as claimed in claim 1, wherein the packs (10) are transported along said pack track (18) exclusively by said turning belts (21, 22, 23, 24) at least during an initial phase of a turning operation.

5. The apparatus as claimed in claim 4, wherein said turning belts (21, 22, 23, 24) and said additional conveyor belts (37, 38) are disposed with an overlapping portion.

6. The apparatus as claimed in claim 1, wherein, on the one hand, the two upper turning belts (21, 23) and, on the other hand, the two lower turning belts (22, 24) are drivable by respective common drive shafts (35), and wherein said apparatus further comprises drive rollers (33, 34), of different dimensions, which are disposed on each of said common drive shafts (35) in order to create differing drive speeds for said turning belts (21, 22, 23, 24).

7. The apparatus as claimed in claim 6, wherein said apparatus further comprises a drive drum (45), disposed on each of said common drive shafts (35), for driving said additional conveyor belts (37, 38).

* * * * *